United States Patent [19]
Carter et al.

[11] Patent Number: 5,599,058
[45] Date of Patent: Feb. 4, 1997

[54] THREE-SIDED CARGO CARRIER

[75] Inventors: Richardo C. Carter; Richard D. Collins, both of Richmond; Batin A. Muhammad, both of Gloucester, all of Va.

[73] Assignee: Peck Recycling Co., Richmond, Va.

[21] Appl. No.: 462,058

[22] Filed: Jun. 5, 1995

[51] Int. Cl.$^6$ .................................................. B60R 27/00
[52] U.S. Cl. ............................................ 296/181; 296/182
[58] Field of Search .......................... 280/400, 423.1, 280/656, 789; 410/3, 4, 31; 296/180.1, 180.2, 181, 182, 36, 27, 24.1

[56] References Cited

U.S. PATENT DOCUMENTS

| | | | |
|---|---|---|---|
| 2,695,810 | 11/1954 | Demos | 280/423.1 |
| 2,823,066 | 2/1958 | Maxson | 296/36 |
| 2,962,250 | 11/1960 | Carey et al. | 280/423.1 |
| 2,974,996 | 3/1961 | Bitterman et al. | 280/423.1 |
| 3,186,756 | 6/1965 | Saut et al. | 296/24.1 |
| 5,026,112 | 6/1991 | Rice | 296/181 |
| 5,273,337 | 12/1993 | Herrmeyer | 296/181 |
| 5,282,663 | 2/1994 | Horton | 296/155 |
| 5,320,402 | 6/1994 | Evers | 296/183 |

*Primary Examiner*—David M. Mitchell
*Assistant Examiner*—Jonathan J. Yun

[57] ABSTRACT

The invention consists of a three-sided trailer for transporting flattened car bodies or other bulky cargo. The sides are constructed of steel H-beam uprights and expanded metal. Steel beams fastened to the floor of the trailer hold the load of flattened vehicles off the metal floor and enable easy pick up of the load by a forklift from the open side of the trailer.

5 Claims, 4 Drawing Sheets

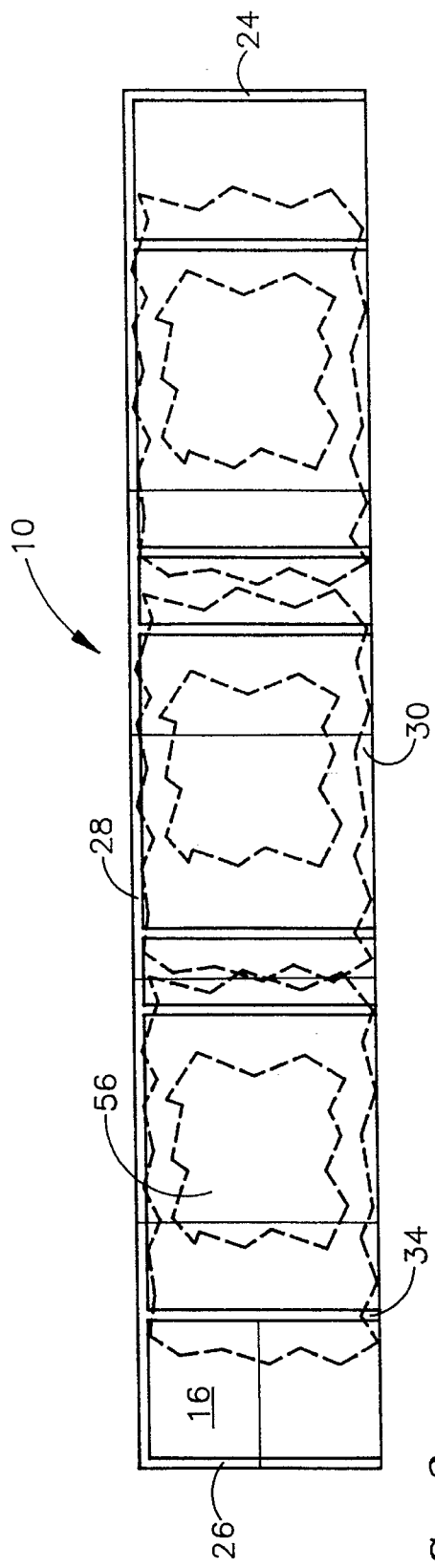
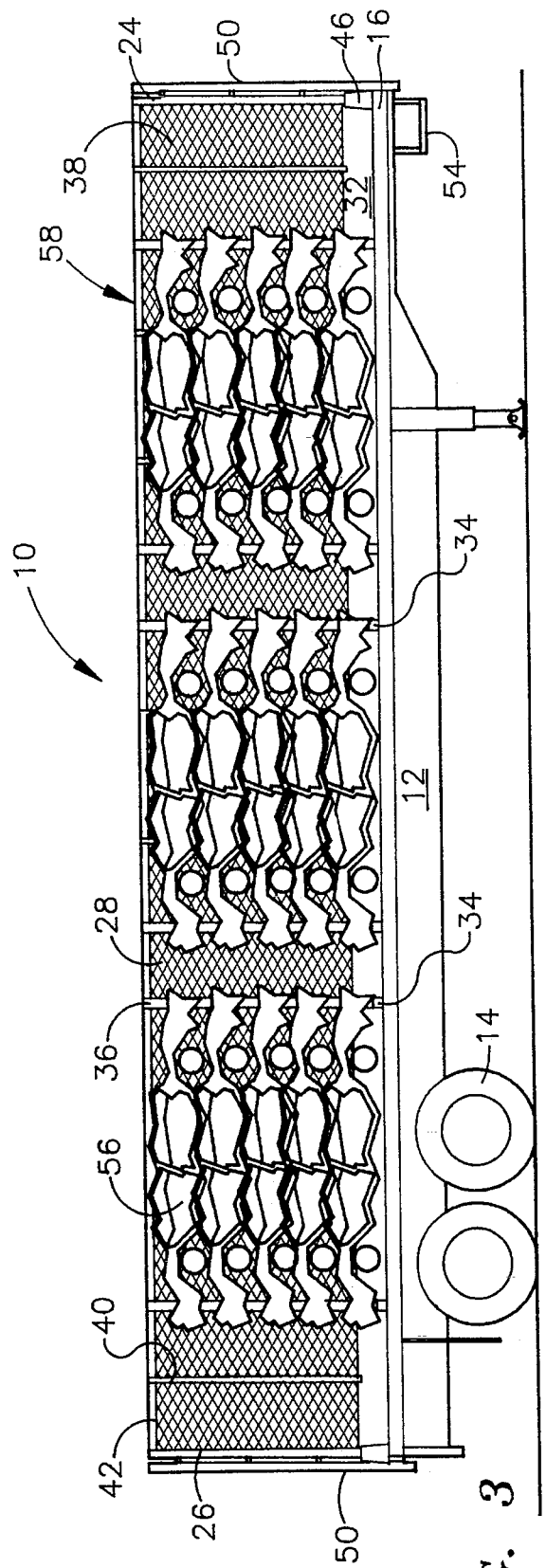
FIG. 2
FIG. 3

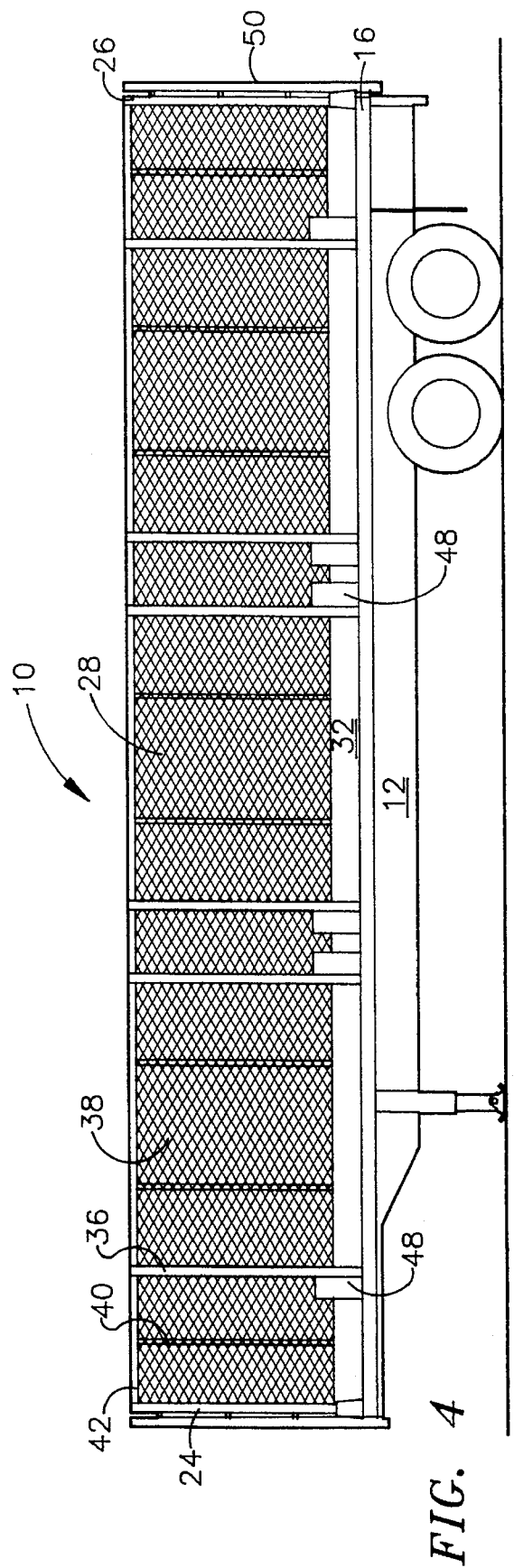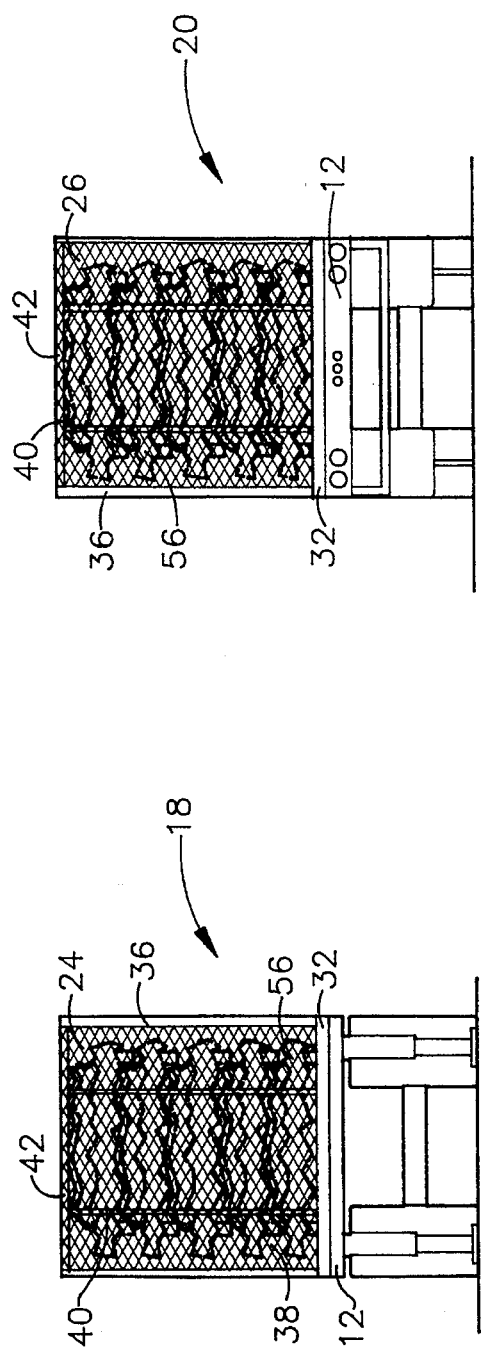

THREE-SIDED CARGO CARRIER

FIELD OF THE INVENTION

This invention relates to trailers, and particularly, to an improved trailer for hauling bulky cargo such as flattened car bodies. For a standard 48 foot long trailer, up to three stacks of flattened car bodies may be loaded end to end on the trailer. The trailer features three side walls with expanded metal construction and one open side for accessing the load. The open side enables easy loading and unloading of bulky cargo with a fork lift or crane and the expanded metal sides allow easy inspection of the load during transit. The trailer is designed with the open side facing the edge of the road so that any debris falling from the open side will fall on the berm of the road. A retainer wall exists on the three closed sides to catch debris falling to those sides.

BACKGROUND OF THE INVENTION

A substantial market exists for wrecked automobiles. The wrecked autos are usually shipped to a metal recycling location where they are chipped into small pieces. The smaller pieces are then processed and sold as the raw material for creating new steel.

Standard flatbed trailers are commonly used to transport the wrecked vehicles. The wrecked vehicles have usually been stripped of non-metals and hazardous substances and then are flattened to enable fitting a full allowable weight on the flatbed trailer. The flattened vehicles are loaded on the flatbed in stacks and each stack is secured with tie down chains.

There are disadvantages in transporting vehicles on standard flatbed trailers. When the wrecked vehicles are flattened, stress is put on various parts of the vehicle which may become dislodged or loose in transit, such as electrically operated mirrors and plastic molding, grilles, etc. Parts that are partially loose after the flattening process may fall off the trailer while the flattened vehicles are in transit and put dangerous debris on the highway.

Another disadvantage of flatbed trailers for transporting flattened vehicles is that there is no reference point for the allowable height of the stacked vehicles. When various wrecked automobiles are flattened, they are reduced to different heights depending on the type and size of vehicle. With a flatbed trailer, there is no visual reference in place on the trailer to guide the allowable height of each stack of flattened vehicles that is loaded on the trailer. Loading the trailer incorrectly can lead to a serious accident on the highway.

Still another disadvantage of using standard flatbed trailers for transporting flattened vehicles involves the inspection of tie down devices during transit. Drivers of trailers must make a visual inspection of the load soon after leaving the origin to ascertain the tightness of the chains. If the load has shifted, adjustments are made to the tie downs to secure the load. As a driver cannot get safely on top of a bulky load such as flattened vehicles, it is very difficult to inspect the tightness and security of the tie down devices.

There is also a safety concern when using flatbed trailers to transport flattened vehicles or other bulky cargo. The person or persons securing the load must crawl or use a ladder to get the tie down chains across the stacks of flattened vehicles. Manipulating the chains across the stacks is very unsafe as the stacks of vehicles are unstable and are prone to slip or tip over.

Another disadvantage of using flatbed trailers to transport flattened vehicles is encountered when removing the load from the trailer. The stacks of flattened vehicles are typically removed with a forklift. As the flatbed trailer is open on all sides and the stacks of flattened vehicles are resting on the bed of the trailer, the forklift driver will find it difficult to wedge the forks under the stacks of flattened vehicles without pushing the vehicles off the bed.

As described by these several limitations, flat bed trailers of the present art have not proven fully satisfactory in transporting bulky cargo such as flattened vehicles.

SUMMARY OF THE INVENTION

This invention consists of a three-sided car trailer for transporting wrecked and flattened vehicles or other bulky cargo. The trailer has side uprights and expanded metal between the uprights along three sides of the trailer. One side is kept open to access the load.

OBJECTS AND ADVANTAGES

One object of the present invention is to provide a trailer for transporting flattened vehicles that will reduce the amount of debris falling to the highway. The present invention accomplishes this by closing off three sides of the trailer with expanded metal. A twelve inch high retainer wall of solid sheet steel is also provided on the three walled sides around the bottom periphery to prevent any small pieces of debris from falling off the trailer bed on those sides. The open side of the trailer is located on the side of the transport vehicle that will be toward the berm of the road, so that any debris falling in that direction will fall to the side of the road.

Another object is to provide a trailer that has a reference point for the allowable height of the load. This is accomplished by making the top of the three closed sides of the trailer thirteen feet from the road surface. This complies with regulations for allowable height and provides an easy visual reference as to the height of the load.

A further object of the invention is to enable the driver to easily inspect the load after departure. Ladders are provided at each end of the trailer, along with handles and footholds, to enable the driver to easily get above the load to inspect the tie down devices. It is common for bulky cargo to shift in the initial phases of transit after departing the origin, and the trailer of the present invention makes it easy to get above the load to inspect the tie downs and ascertain whether they are secure.

The three-sided trailer also has the advantage of reducing the safety risk when securing the load on the trailer. The ladders at each end of the trailer enable the operator to get on top of the load to correct the path of the tie down devices if it is necessary.

Another advantage of the three-sided trailer is encountered when removing the load from the trailer. Cross beams located on the floor of the trailer hold the flattened car bodies off the floor. The cross beams provide clearance for the forks of a forklift to easily get under the load.

DESCRIPTION OF THE DRAWINGS

FIG. 2 is a top view showing three stacks of flattened car bodies loaded on the three-sided trailer.

3

FIG. 3 is a right side view of the three-sided trailer with three stacks of flattened car bodies and a floor of solid sheet steel.

FIG. 4 is a left side view of the three-sided trailer.

FIG. 5 is a front view of the three-sided trailer with the ladders omitted depicting the flattened car bodies within the expanded metal wall.

FIG. 6 is a rear view of the three-sided trailer with the flattened car bodies shown within the expanded metal walls and the ladders omitted.

Figure 7:
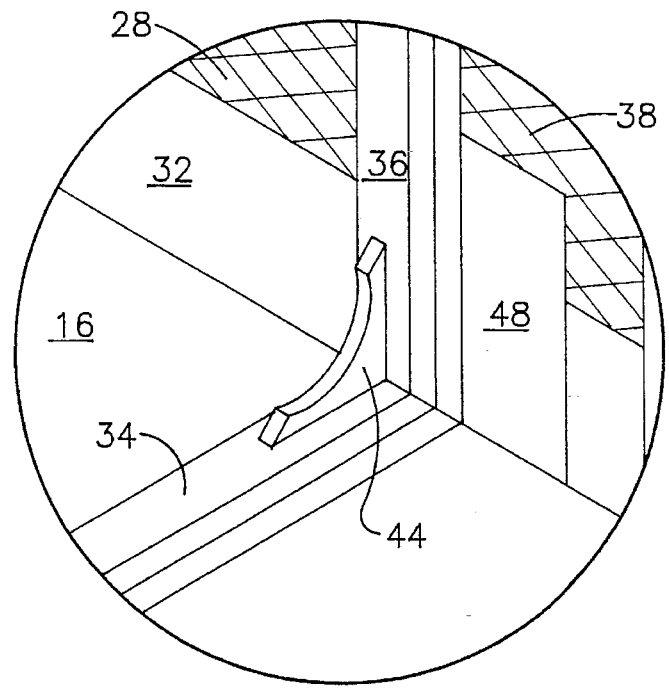

FIG. 7 is a view of a detail of the three-sided trailer, a cargo spacing gusset that supports one of the vertical columns.

Figure 8:
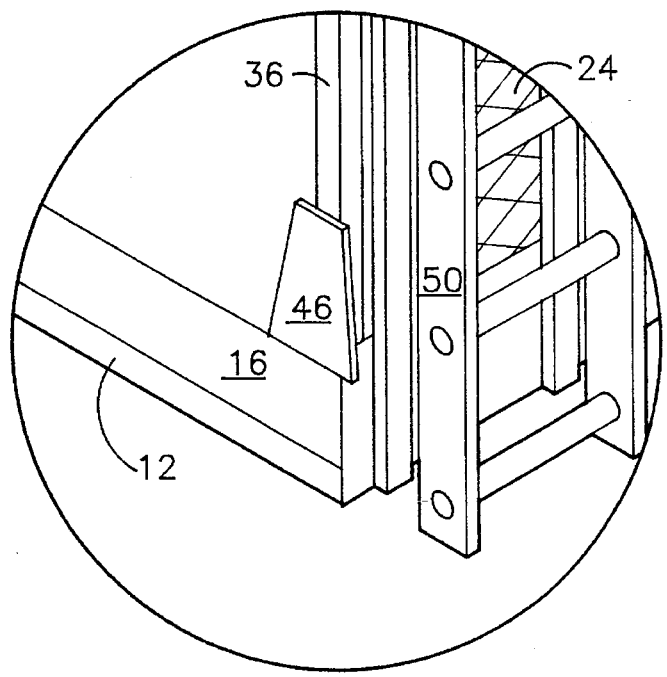

FIG. 8 is a view of a detail of the three-sided trailer, an end gusset that supports the corner vertical columns.

DESCRIPTION OF THE INVENTION

The invention is a three-sided trailer for transporting flattened car bodies or other bulky cargo. Up to three stacks of flattened car bodies may be loaded end to end on the trailer.

Figure 1:
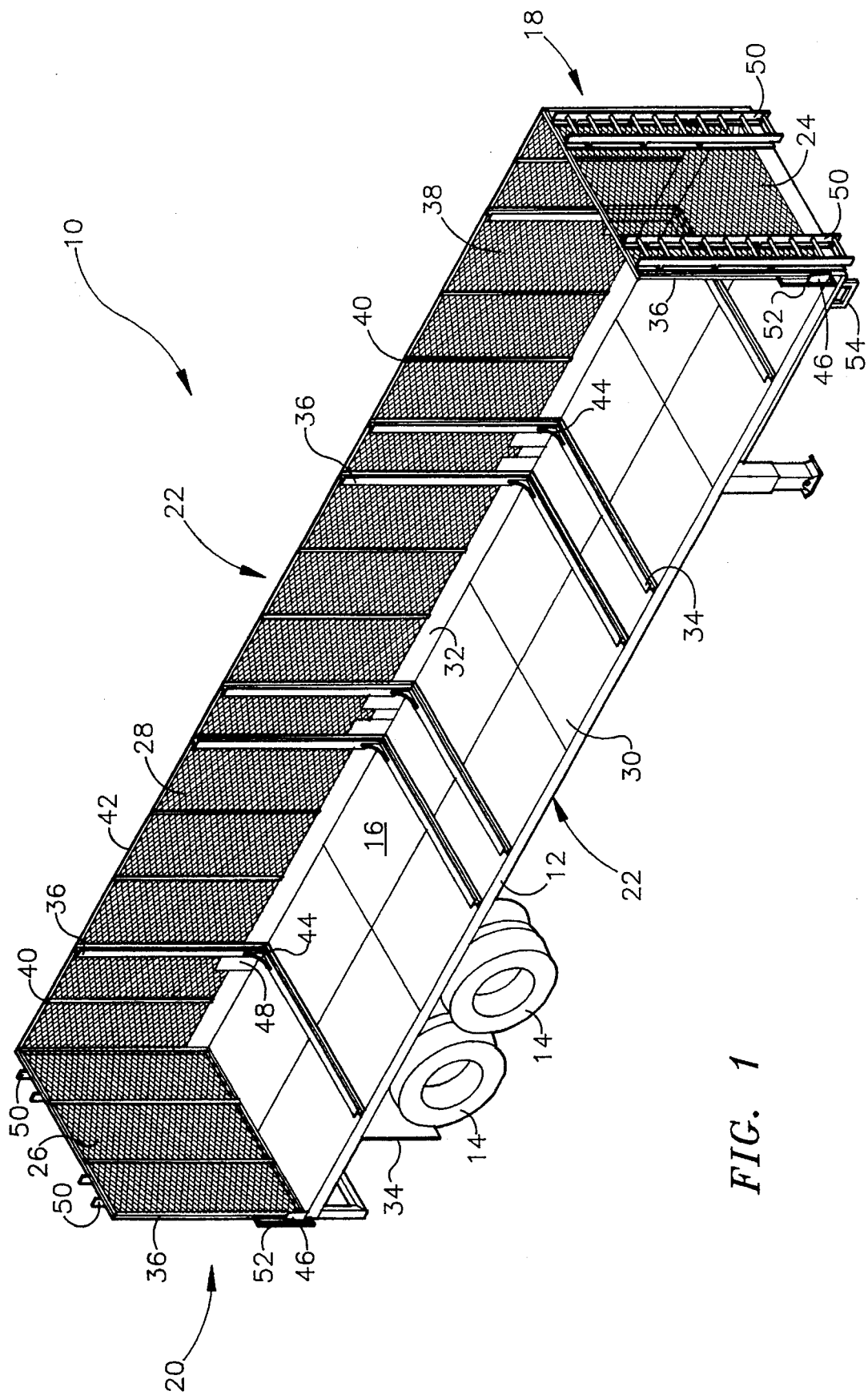
FIG. 1 is a perspective view of the three-sided trailer of this invention.

FIG. 1 is a perspective view of the three-sided trailer of this invention. The trailer 10 is shown with a bed or frame 12, wheels 14, a floor 16, a front end 18, a rear end 20, and two elongated sides 22. The trailer has a front wall 24, a rear wall 26, a side wall 28, and an open side 30 on the right side.

The front 24, rear 26, and side 28 walls consist of vertical columns 36 and expanded metal 38. The expanded metal 38 is also supported by vertical supports 40 intermediate the vertical columns 36 and by horizontal supports 42 along the top of each wall. The vertical columns 36 are constructed of solid steel H-beams. Cross beams 34 are attached laterally across the floor 16 of the three-sided trailer 10. Cargo centering gussets 44 are welded at the juncture of the vertical columns 36 and the cross beams 34. A metal retainer wall 32 is provided around the lower periphery of each of the walled sides of the trailer.

End gussets 46 help stabilize and support the vertical columns 36 located at the end of the front 24 and rear 26 walls. Relief openings 48 are provided in the side wall 28 and metal retainer wall 32 to allow passage for chains or other tie down devices to secure the load. Ladders 50 are provided on the front 24 and rear 26 walls to allow an operator easy access to view the load. Handles 52 and foot rests 54 are provided near the corner vertical columns 36 facing the open side 30 of the trailer 10 to provide an easy access point for climbing onto the floor 16 of the trailer.

FIG. 2 is a top view showing the load, three stacks of flattened car bodies 56, in dotted lines after being loaded on the trailer 10. The front 24, rear 26, and side 28 walls are shown. The open side 30 is on the right side of the trailer. The cross beams 34 are spaced apart at a distance that allows the flattened car bodies 56 to straddle the cross beams 34. Two cross beams 34 therefore support each stack of flattened car bodies 56, with a cross beam 34 toward each end of the stack. The exact location at which the cross beams 34 support each stack depends on the size of car bodies in the stack. Car bodies can be essentially compact, medium, or full size and the cross beams 34 are spaced at a distance to support any of these three sizes. The cross beams 34 can also support flattened pickups, buses, or other vehicles. The solid metal floor 16 is shown in this top view surrounding each of the stacks of flattened car bodies.

FIG. 3 is a right side view of the three-sided trailer with three stacks of flattened car bodies 56 and a floor 16 of solid sheet steel supported on the trailer's bed 12. A twelve inch high metal retainer wall 32 constructed of solid sheet steel is provided to prevent debris from the load from falling to the road surface. The front 24, rear 26, and side 28 walls of the trailer are typically thirteen feet high from the road surface to comply with regulations and to provide a visual reference to loaders when loading the trailer. The trailer 10 will typically hold stacks of five flattened car bodies 56 as shown in FIG. 3. Experience has shown that three stacks of flattened car bodies having five bodies in each stack will comprise a full load, or approximately a 45,000 pound payload. Typically, a trailer that is 96 inches wide will accommodate a stack of flattened car bodies of any size, compact, medium, or full size. The trailer can also be manufactured in a 102 inch width, which is permissible by federal and state laws, to handle larger flattened vehicles which are wider than 96 inches, such as flattened buses. The 102 inch wide trailer prevents the flattened bus bodies from overhanging the open side of the trailer, as would occur if flattened buses were loaded on a 96 inch wide trailer. Typically, both the 96 inch and 102 inch wide trailers are 48 feet long.

As shown in FIG. 4, a left side view of the three-sided trailer, the expanded metal 38 is fastened within the vertical columns 36. The expanded metal is typically 0.188 inch thick. Vertical 40 and horizontal 42 supports brace the expanded metal 38 between the vertical columns 36. Relief openings 48 are provided at each location near a cross beam (not shown) to enable pulling the tie down devices through for securing the load.

As shown in FIG. 5, a front view of the three-sided trailer, up to five flattened car bodies 56 may be stacked on the floor of the trailer. As depicted in the drawing, the bottom car body will not be entirely visible from the front end 18, as it is partially obstructed from view by the metal retainer wall 32 around the bottom periphery of the walled sides of the trailer. This drawing shows the vertical columns 36, the vertical 40 and horizontal 42 supports, and the expanded metal 38 that comprise the front wall 24 of the trailer.

FIG. 6, a rear view of the three-sided trailer, also depicts five flattened car bodies 56 stacked on the floor of the trailer. As depicted in the drawing, the bottom car body will not be entirely visible from the rear end 20, as it is partially obstructed from view by the metal retainer wall 32 around the bottom periphery of the walled sides of the trailer. This drawing shows the vertical columns 36, the vertical 40 and horizontal 42 supports, and the expanded metal 38 that comprise the rear wall 26 of the trailer.

FIG. 7 is a view of a detail of the three-sided trailer, a cargo centering gusset 44 that supports one of the vertical columns 36. The cargo centering gusset 44 is typically of steel construction and is welded to both the vertical column 36 and the cross beam 34 that adjoins it. The relief openings 48 for the tie down devices are cut through both the expanded metal 38 sides and the metal retainer wall 32. The metal retainer wall 32, the cross beams 34, and the vertical columns 36 all extend from the solid metal floor 16 of the trailer.

FIG. 8 is a detail view of an end gusset 46 that supports each vertical column 36 situated at the open side of the trailer. In this figure the front wall 24 is depicted. The end gusset 46 is typically of solid steel plate construction and is typically welded to the floor 16 of the trailer and to the vertical column 36. The frame 12 and a ladder 50 are also shown in the drawing but the handle and foot rest are omitted.

The three sided trailer of this invention provides several advantages over the present art methods of transporting flattened car bodies and other bulky cargo. As shown in FIG.

1, the trailer 10 typically is configured with an open right side 30 for countries in which vehicles travel the right lane of the highway. Thus, most debris falling from the cargo will either be stopped by the expanded metal sides 38 and metal retainer wall 32 of the trailer or will drop to the berm of the roadway. Drivers of the three-sided trailer are instructed to keep to the far right lane of the highway during transport unless it is absolutely necessary to use another lane for passing or emergencies.

The trailer 10 also provides an easy visual reference point for loading the vehicle. As shown in FIG. 3, typically five flattened car bodies may be stacked on the floor of the trailer 10. The top 58 of the sides of the trailer is thirteen feet off of the road surface which complies with regulations and provides the visual reference point. A loader will know that the overall height of the trailer will not exceed regulations if the load is kept at the height of the sides or lower.

Another object of the invention, enabling the driver to easily check the security and tightness of the tie down devices is provided by the ladders 50 at each end of the trailer as shown in FIG. 1, and the foot rests 54 and handles 52. The ladders 50 enable the driver to get above the load where he can visually check the tie downs on top of the load. The foot rests 54 and handles 52 enable the driver to easily step onto the floor 16 of the trailer to inspect the load from that location. The ladders, foot rests and handles also reduce the safety risk involved in inspecting the load, as these access devices are not available on standard flat bed trailers.

As shown in FIG. 1, better load centering is provided by the three-sided trailer of this invention than is available with standard flat bed trailers. The cargo centering gussets 44 both reinforce the joint and help funnel the load to the center of the trailer 10 by virtue of the curve and its spacing from the column.

The three-sided trailer of this invention is easier to load and unload than a standard flat bed trailer as a result of the cross beams 34 shown in FIG. 1. The cross beams 34 keep the stacks of flattened car bodies or other bulky cargo off the floor 16 of the trailer, thereby enabling the forks of a forklift to easily pull out from under the load after loading the trailer and also enabling a forklift to easily slip under the load when unloading the trailer. As shown in FIG. 3, the load is kept above the floor 16 of the trailer 10. Typically the cross beams 34 are constructed of 4 by 4 inch H-beams which keeps the load at 4 inches above the floor of the trailer.

As depicted in the drawings, the three-sided trailer of this invention may be used to move flattened metal vehicle bodies from an assembly point to a processing point in the following manner:

1) A three-sided trailer 10 is provided as shown in FIG. 1 with wheels 14 attached to a frame 12 supporting a flat metal floor 16 with a front end 18, rear end 20, and two elongated sides 22. A front wall 24, a rear wall 26, a side wall 28 on the left and an open side 30 on the right are provided. At least six cross beams 34 of a height to accommodate the forks of a standard forklift are attached to the floor 16 of the trailer 10. Vertical support columns 36 in the side wall 28 are also 4 by 4 inch H-beams extending toward the interior of the trailer 10 a sufficient distance to provide space between the side wall 28 and inboard side of the column to accommodate the tongs of a vertical lifting device in the space. The walls 24, 26, and 28 have a height less than the height of any obstructions that would be encountered by the trailer on the road over which it is expected to travel. The walls 24, 26, and 28 are primarily of open mesh metal with a solid sheet of metal 32 substantially around the bottom periphery.

2) A multiplicity of flattened vehicle bodies 56 are stacked adjacent the trailer 10 and are lifted by a fork lift onto the trailer 10 from the open side 30 so that the bodies bridge at least two of the cross beams 34 as shown in FIG. 3.

3) Tie downs, preferably chains (not shown), are placed over the top of the stacked flattened vehicle bodies 56 with the termination of the tie downs being in the vicinity of the two elongated sides 22 of the trailer 10. The tie downs are tightened to hold the stacked vehicle bodies in place. The tie downs on the left side are accessed through relief openings 48.

4) The flattened vehicle bodies 56 on the trailer 10 are transported for a partial distance of the trip, usually around 25 miles. The trailer is then stopped and the load inspected and any deficiencies in the original loading are corrected.

5) The trip is then resumed until the processing point is reached. Upon reaching the processing point, the tie downs are unfastened and the stacked flattened vehicles 56 are removed for further processing by either inserting the forks of a forklift truck between the bottom of the flattened vehicle bodies 56 and the floor 16 of the trailer 10 or inserting the tongs of a vertical lift between the side wall 28 of the trailer 10 and the side of the flattened vehicle bodies 56.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A three-sided cargo carrying vehicle comprising:

a frame having a front end, a rear end, and two elongated sides;

wheels mounted on the underside of said frame;

a floor on the upper side of said frame;

a multiplicity of cross-beams extending across said floor and having a height above said floor to hold bulky cargo above said floor a sufficient distance to permit the insertion of the fork of a forklift truck between said floor and the cargo;

a front wall attached to said front end of said frame;

a rear wall attached to said rear end of said frame;

a side wall attached to one of said elongated sides of said frame with the other of said elongated sides of said frame not having a wall and being an open side whereby cargo can be readily loaded and unloaded from said open side; and a multiplicity of vertical columns supporting said side wall from the inside and having a sufficient depth to hold bulky cargo away from said side wall a sufficient distance to permit the insertion of a tong of a vertical lift between said side wall and the cargo.

2. The vehicle of claim 1 wherein at least some of said vertical columns are reinforced by a cargo spacing gusset fastened at the lower end of said vertical columns and extend in the direction of said open side and said gusset being sized and shaped to hold bulky cargo away from said side wall to help center the cargo on the vehicle.

3. The vehicle of claim 1 wherein said side wall is composed mostly of open mesh metal to permit inspection of the cargo.

4. The vehicle of claim 3 wherein said front end and said rear end is composed mostly of open metal mesh to permit inspection of the cargo.

5. The vehicle of claim 3 wherein said side walls have openings in the bottom adjacent said floor to permit access for adjusting and fastening tie downs.

* * * * *